US008725147B2

(12) United States Patent
Kono

(10) Patent No.: US 8,725,147 B2
(45) Date of Patent: May 13, 2014

(54) RADIO COMMUNICATION TERMINAL, BASE STATION, HANDOFF CONTROL METHOD AND BASE STATION CONTROL METHOD CAPABLE OF ACHIEVING HANDOFF WHILE CONTINUING SERVICE SUCH AS BROADCAST SERVICE AND/OR MULTICAST SERVICE

(75) Inventor: Kenji Kono, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1086 days.

(21) Appl. No.: 11/444,972

(22) Filed: May 31, 2006

(65) Prior Publication Data
US 2007/0025295 A1 Feb. 1, 2007

(30) Foreign Application Priority Data
May 31, 2005 (JP) ............................ P.2005-160744

(51) Int. Cl.
*H04W 36/00* (2009.01)
(52) U.S. Cl.
USPC ............ 455/436; 455/439; 455/466; 370/331
(58) Field of Classification Search
USPC ......... 370/331–332, 338, 333, 335, 343, 465; 455/436–440, 442, 466; 375/134, 267; 709/238
See application file for complete search history.

(56) References Cited

U.S. PATENT DOCUMENTS 6,690,659 B1 * 2/2004 Ahmed et al. ............... 370/352
7,254,409 B2 8/2007 Sato et al.
7,369,517 B2 * 5/2008 Dillinger et al. ............. 370/310
2001/0019957 A1 * 9/2001 Kusaki et al. ................ 455/436
2002/0167921 A1 * 11/2002 Vakil et al. ................... 370/331
2003/0002525 A1 * 1/2003 Grilli et al. ................... 370/465
2003/0078044 A1 * 4/2003 Leung ........................... 455/436
2003/0162543 A1 8/2003 Auranen et al.
2003/0223422 A1 * 12/2003 Igarashi et al. ............... 370/390
2004/0077349 A1 * 4/2004 Barak et al. .................. 455/436
2004/0120285 A1 6/2004 Paila et al.

(Continued)

FOREIGN PATENT DOCUMENTS

JP 2000092542 A 3/2000
JP 2002171548 A 6/2002

(Continued)

OTHER PUBLICATIONS

Chinese language office action and its English language translation for corresponding Chinese application 200610089989.3, Sep. 22, 2009.

(Continued)

*Primary Examiner* — Mahendra Patel
(74) *Attorney, Agent, or Firm* — DLA Piper LLP (US)

(57) ABSTRACT

A radio communication terminal (AT) includes a communication section for performing a radio communication with a base station, and a controller. Before performing a handoff from a first base station to another peripheral base station while receiving service information delivered by the first base station, the controller checks a progress of sequence of the service information being received. Then, the controller performs a handoff control depending on the check result. When it is determined that reception of a packet having the sequence number being received is to be completed within a certain time as a result of checking the progress, the controller suspends the handoff until the reception of the packet is completed.

2 Claims, 11 Drawing Sheets

(56) References Cited

U.S. PATENT DOCUMENTS

| | | |
|---|---|---|
| 2004/0166860 A1* | 8/2004 | Neufeld et al. ............... 455/437 |
| 2005/0073990 A1* | 4/2005 | Chang et al. .................. 370/349 |
| 2005/0208942 A1* | 9/2005 | Pekonen et al. ............. 455/436 |
| 2008/0076432 A1* | 3/2008 | Senarath et al. ............. 455/442 |

FOREIGN PATENT DOCUMENTS

| | | | |
|---|---|---|---|
| JP | 2002271258 A | | 9/2002 |
| WO | 03037030 | A1 | 5/2003 |
| WO | 03073774 | A1 | 9/2003 |
| WO | WO 2004006448 | A2 * | 1/2004 |

OTHER PUBLICATIONS

Japanese language office action dated Jun. 1, 2010 and its English language translation for corresponding Japanese application 2005160744.

* cited by examiner

BROADCAST DATA AND USER DATA TRANSMISSION SCHEDULE
IN 1xEV-DO COMMUNICATION SYSTEM

PACKET CLASSIFICATION

FIG. 6

| Field | Length(bit) |
|---|---|
| MessageID | 8 |
| PilotPN | 9 |
| Channel Included | 1 |
| Channel | 0 or 24 |
| BCMCSFlowFormat | 1 |
| BCMCSFlowIDLength | 2 |

Zero or one occurrence of the following record

| | |
|---|---|
| BCMCSFlowCount | 6 |

BCMCSFlowCount occurrences of the following three fields

| | |
|---|---|
| BCMCSFlowID | 0 or (BCMCSFlowIDLength+1) x 8 |
| SequenceNO | 16 |

Zero or one occurrence of the following record

| | |
|---|---|
| ProgramCount | 0 or 6 |

ProgramCount occurrences of the following four fields

| | |
|---|---|
| ProgramIDLSBLength | 0 or 5 |
| ProgramIDLSBs | 0 or ProgramIDLSBLength |
| FlowDiscriminatorCount | 0 or 6 |
| FlowDiscriminatorLength | 0 or 3 |
| SequenceNO | 0 or 16 |

FlowDiscriminatorCount occurrences of the following fields

| | |
|---|---|
| FlowDiscriminator | 0 or FlowDiscriminatorLength |
| SequenceNO | 0 or 16 |

| | |
|---|---|
| Reserved | 0-7 (as needed) |

BCMCSHandoff Message

FIG. 7

| Field | Length(bit) |
|---|---|
| MessageID | 8 |
| SystemTime | 36 |

HandoffSync Message

FIG. 14
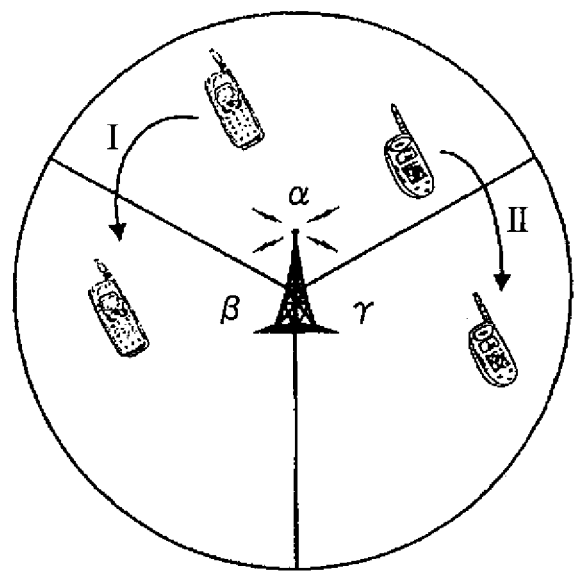
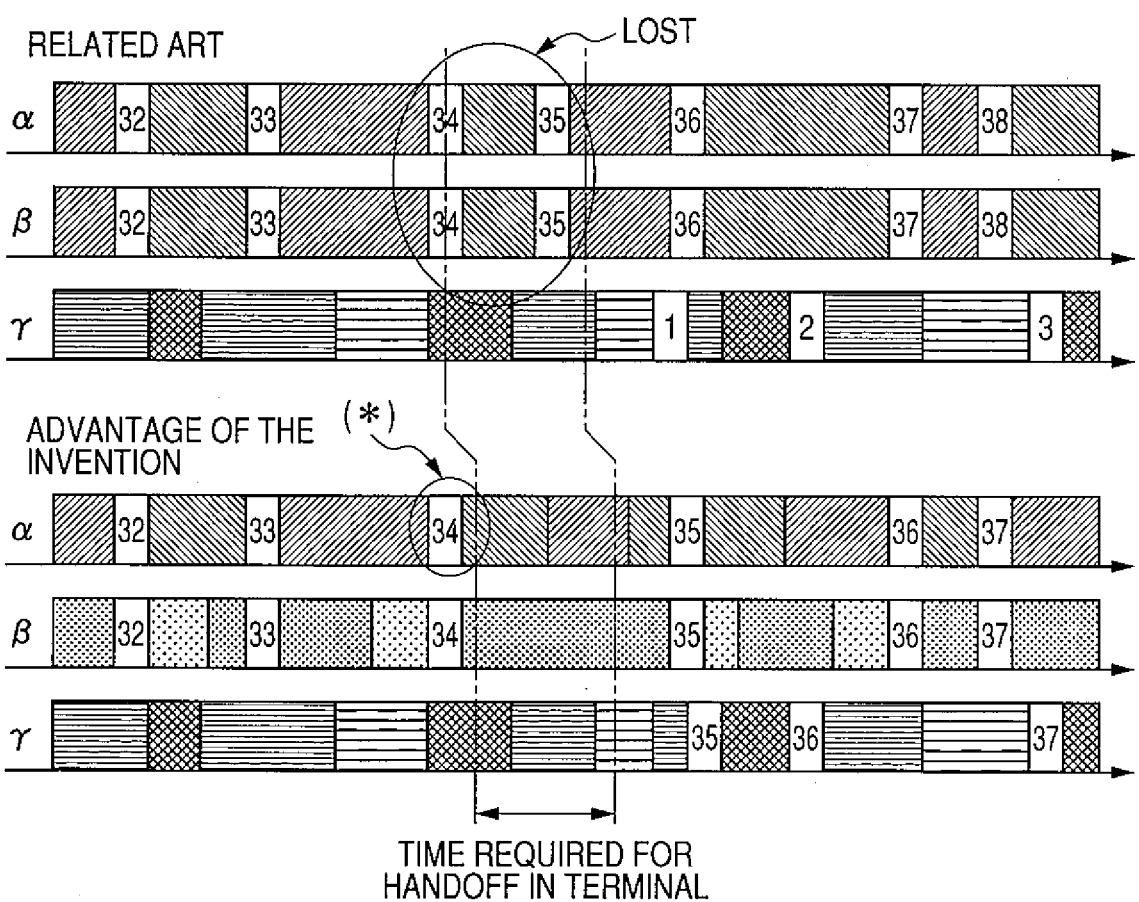

RADIO COMMUNICATION TERMINAL, BASE STATION, HANDOFF CONTROL METHOD AND BASE STATION CONTROL METHOD CAPABLE OF ACHIEVING HANDOFF WHILE CONTINUING SERVICE SUCH AS BROADCAST SERVICE AND/OR MULTICAST SERVICE

This application claims foreign priority based on Japanese Patent application No. 2005-160744, filed May 31, 2005, the content of which is incorporated herein by reference in its entirety.

BACKGROUND OF THE INVENTION

1. Field of the Invention

The present invention relates to a radio communication terminal, a base station, a handoff control method and a base station control method that are employed in a radio communication system compatible with a broadcast service and/or a multicast service, for example.

2. Description of the Related Art

1xEV-DO (1x Evolution Data Only) communication system has been commercialized, and one of the system functions is a broadcast multicast service (BCMCS).

In the broadcast service, a radio communication network is used, and a base station continuously transmits data in a connectionless form to all radio communication terminals within a service area (for example, a cell or a sector) of the base station. That is, the broadcast service is one form of services of "broadcasting."

The multicast service is similar to the broadcast service. The multicast service is one form of a service in which broadcasting is performed so that only specific users among the radio communication terminals within the service area who have signed up for specified service information (for example, a fee-based service) can receive the data.

FIG. 1 is a diagram showing a broadcast data and user data transmission schedule in the 1xEV-DO communication system. FIG. 2 is a diagram showing a broadcast data transmission schedule for each base station in the 1xEV-DO communication system.

In the broadcast service provided by the 1xEV-DO communication system, unlike a unicast data communication, the base station distributes the same data for all the users requesting for the data (FIG. 1).

Depending on a system, the base station synchronizes or does not synchronize the broadcast data transmission schedule for a unit of multiple base stations or for a unit of multiple sectors according to the base station.

For example, in a base station A shown in FIG. 2, broadcast schedules of the broadcast data in sectors α, β and γ are the same. In a base station B, broadcast scheduling is made for each sector.

In case where the broadcast data to be broadcasted has an excessively large data size, such data is expected to be divided into smaller packets and broadcasted in the smaller packets as shown in FIG. 3. The divided packets are expected to be assigned with a sequence number in an upper layer to be managed so that the divided packets can be complemented in decoding.

In a radio communication system, as a technique for connecting the communication while a radio communication terminal moves across service areas (for example, cells or sectors) each covered by a base station, processing is performed to switch between base stations in response to a communication quality between the radio communication terminal and the base station. This processing is called handoff processing. The radio communication terminal measures both an intensity of a signal transmitted from the base station under connection and an intensity of a signal transmitted from each of the peripheral base stations in order to perform the processing for maintaining more appropriate radio wave conditions.

For example, in a case of a CDMA (Code Division Multiple Access) radio communication system of IS95 system, the radio communication terminal measures the signal intensity (communication quality) of a signal coming from the base station currently under connection with the radio communication terminal and the signal intensity of a signal coming from each of the peripheral base stations. Then, while the radio communication terminal is under communication, the radio communication terminal transmits the measured signal intensity to the base station. Then, the base station determines whether the handoff is to be performed based on the transmitted signal intensity. On the other hand, when the radio communication terminal is in a standby mode, the radio communication terminal itself determines whether the handoff is to be performed based on the measured signal intensity.

Generally, in the 1xEV-DO communication system, while the handoff operation is typically performed by the terminal when the terminal is in the standby mode, the terminal does not notify the base station of the handoff before and after the handoff is performed.

During the communication, the base station once assigns a handoff destination, and after that, the terminal performs the handoff. In this case, the terminal notifies the base station of the handoff before and after the handoff is performed (FIG. 10: Sequence 1: Handoff under communication).

However, "under reception of broadcast data" does not necessarily mean "under communication". Therefore, a terminal that is not involved in a usual unicast data communication, even though the terminal is under reception of the broadcast data, does not necessarily notify the base station when the handoff is performed.

In a case where the handoff is made between areas where the schedule of the broadcast data is synchronized under the reception of the broadcast data, the handoff operation in the 1xEV-DO communication system requires approximately a period of 150 slots at the maximum when the handoff is made. Thus, the broadcast data cannot be received while the handoff is performed.

In a case where the schedule of the broadcast data is not synchronized between the areas involved in the handoff, and the base station of the handoff destination has not yet delivered the broadcast data after the handoff is performed, delivery is made from the data which is already received (from the beginning) as shown in FIG. 4.

SUMMARY OF THE INVENTION

The present invention has been made in view of the above circumstances and has an object to overcome the above problems, and provide a radio communication terminal, a base station, a handoff control method and a base station control method which are capable of smoothly continuing communication of service information before and after a handoff is performed, in a case where the handoff is performed while the service information such as broadcast data is being received.

In some implementations, a radio communication terminal of the invention comprises: a receiver which receives a broadcast of at least one of a broadcast service and a multicast service; and a controller which performs a handoff processing based on a completion state of reception of a packet which is in a layer higher than a radio communication layer, when a handoff is to be performed while the receiver receives the broadcast.

Preferably, in the radio communication terminal of the invention, the controller suspends the handoff processing until the reception of the packet is completed.

Preferably, the radio communication terminal of the invention further comprises: a transmitter, wherein when the reception of the packet is completed, or when it takes equal to or more than a predetermined time to complete the reception of the packet, the controller performs a control so that the transmitter transmits a first message indicating the handoff is to be performed.

Preferably, in the radio communication terminal of the invention, the first message includes identification information of the broadcast being received by the receiver, a sequence number of the packet being received, and information on a base station of a handoff destination.

Preferably, in the radio communication terminal of the invention, when the receiver receives a second message specifying a time to perform the handoff, from a base station after the transmitter transmits the first message, the controller performs the handoff processing at the time specified in the second message.

In some implementations, a base station of the invention comprises: a broadcasting section which performs a broadcast of at least one of a broadcast service and a multicast service; a receiver which receives a first message indicating a handoff is to be performed from at least one radio communication terminal, the first message including identification information of the broadcast being received by the radio communication terminal, a sequence number of a packet which is in a layer higher than a radio communication layer received by the radio communication terminal, and information on a base station of a handoff destination; a notifying section which notifies the base station of the handoff destination, of the identification information of the broadcast and the sequence number of the packet; and a transmitter which transmits a second message indicating a time to perform the handoff to the radio communication terminal.

Preferably, in the base station of the invention, when the receiver receives the first message from each of the plurality of radio communication terminals, the transmitter transmits the second message indicating the time to perform the handoff being set based on the first message that is received the latest to each of the plurality of radio communication terminals.

In some implementations, a base station of the invention comprises: a broadcasting section which performs a broadcast of at least one of a broadcast service and a multicast service; a receiver which receives identification information of a broadcast being received by a radio communication terminal from another base station, and a sequence number of a packet which is in a layer higher than a radio communication layer received by the radio communication terminal; and a controller which performs a control so that the broadcasting section performs the broadcast based on the received identification information and the received sequence number of the packet after a handoff of the radio communication terminal from the another base station is performed.

In some implementations, a handoff control method comprises: receiving a broadcast of at least one of a broadcast service and a multicast service; and performing a handoff processing based on a completion state of reception of a packet which is in a layer higher than a radio communication layer, when a handoff is to be performed while receiving the broadcast.

Preferably, the handoff control method of the invention further comprises: suspending the handoff processing until the reception of the packet is completed.

Preferably, the handoff control method of the invention further comprises: transmitting a first message indicating the handoff is to be performed, when the reception of the packet is completed, or when it takes equal to or more than a predetermined time to complete the reception of the packet.

Preferably, in the handoff control method of the invention, the first message includes identification information of the broadcast being received, a sequence number of the packet being received, and information on a base station of a handoff destination.

Preferably, in the handoff control method of the invention, when a second message specifying a time to perform the handoff, is received from a base station after transmitting the first message, the second message the handoff processing is performed at the time specified in the second message.

In some implementations, a base station control method comprises: performing a broadcast of at least one of a broadcast service and a multicast service; receiving a first message indicating a handoff is to be performed from at least one radio communication terminal that is receiving the broadcast, the first message including identification information of the broadcast being received by the radio communication terminal, a sequence number of a packet which is in a layer higher than a radio communication layer received by the radio communication terminal, and information on a base station of a handoff destination; notifying the base station of the handoff destination, of the identification information of the broadcast and the sequence number of the packet; and transmitting a second message indicating a time to perform the handoff to the radio communication terminal.

Preferably, in the base station control method of the invention, when the first message is received from each of the plurality of radio communication terminals, the second message indicating the time to perform the handoff being set based on the first message that is received the latest is transmitted to each of the plurality of radio communication terminals.

In some implementations, a base station control method of the invention comprises: performing a broadcast of at least one of a broadcast service and a multicast service; and receiving identification information of a broadcast being received by a radio communication terminal from another base station, and a sequence number of a packet which is in a layer higher than a radio communication layer received by the radio communication terminal, wherein the broadcast is performed based on the received identification information and the received sequence number of the packet after a handoff of the radio communication terminal from the another base station is performed.

According to the invention, in case where the handoff is performed while the service information such as the broadcast data is being received, it is possible to smoothly continue the communication of the service information before and after the handoff is performed.

BRIEF DESCRIPTION OF THE DRAWINGS

FIG. 6 is a diagram showing a BCMCS handoff message.

FIG. 7 is a diagram showing a Handoff Sync Message.

FIG. 14 is a diagram illustrating advantages of the invention.

DESCRIPTION OF THE PREFERRED EMBODIMENTS

An embodiment of the invention will be described referring to drawings.

Figure 5:
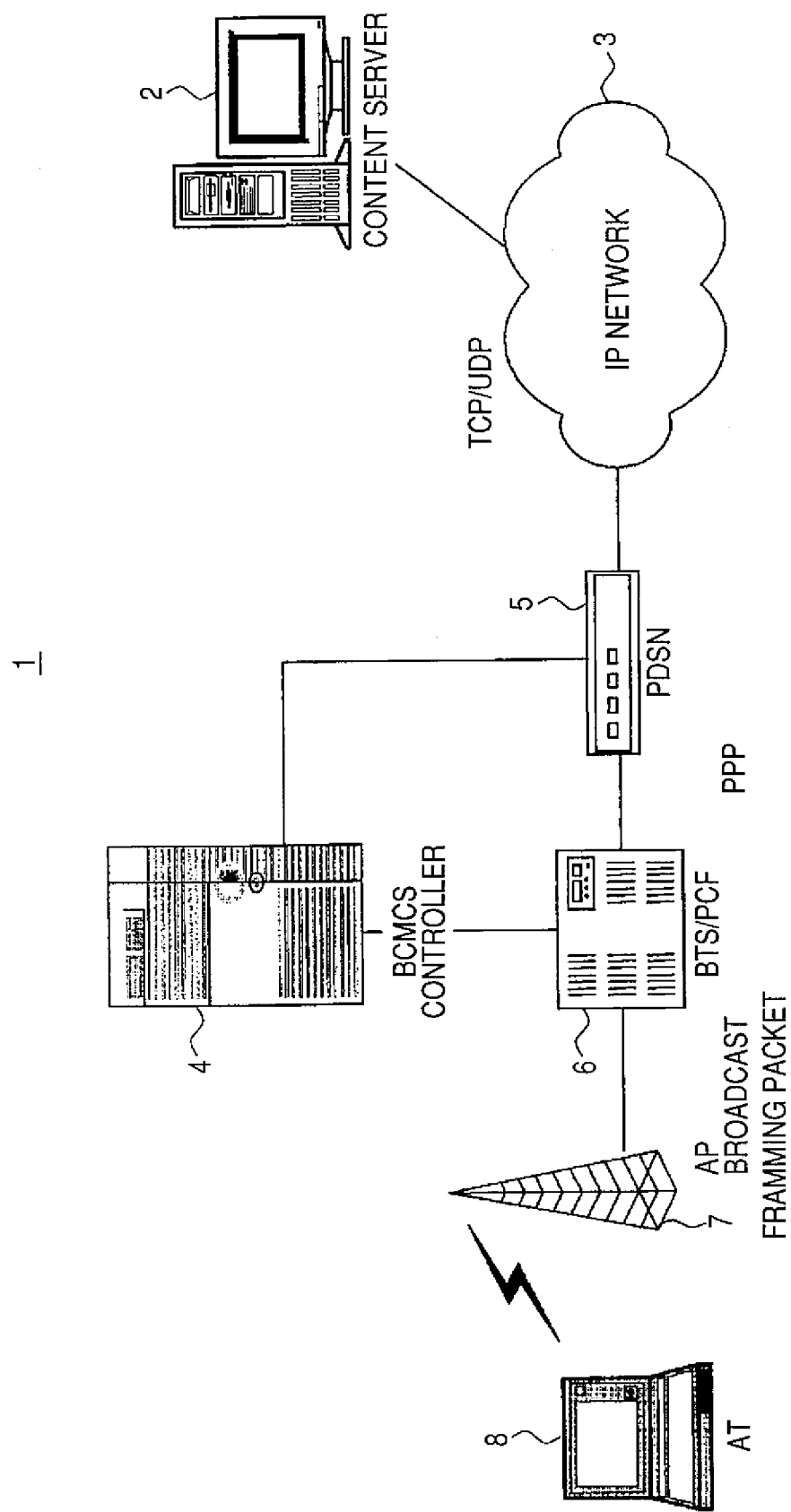
FIG. 5 is a block diagram of a radio communication system according to an embodiment of the invention.

FIG. 5 is a block diagram of a radio communication system according to an embodiment of the invention.

In the radio communication system 1 in FIG. 5, a contents server 2 is connected via an IP network 3 to a PDSN 5 that is controlled by a broadcast/multicast service (BCMCS) controller 4. The PDSN 5 is connected via BTS/PCF 6 to an access point (AP) 7 that serves as a base station. The PDSN 5 stands for a packet data serving node.

The radio communication system 1 and a radio communication terminal (AT: Access Terminal) 8 according to this embodiment are configured so as to be compatible at least with the 1xEV-DO communication system (second communication system), among the CDMA2000 1x communication system (first communication system) which is a code division multiplex type, and the 1xEV-DO communication system (the second communication system) which is a time division multiplex type.

The access point (AP) 7 which serves as the base station employs as a service area a cell (or a sector) that is covered by the base station, and broadcasts (distributes) service information provided by the contents server 2 to all the radio communication terminals (ATs) 8 present in the service area.

Forms of the data broadcasted via the broadcast service or the multicast service include, specifically, character information, audio and music information, video information, and the like, and herein, these data are all called as the service information.

In the BCMCS, between the radio communication terminal (AT) 8 and the access point (AP) 7 as the base station, the radio communication terminal (AT) 8 one-sidedly receives the data broadcasted by the access point (AP) 7.

In the radio communication system 1 in this embodiment, the radio communication terminal (AT) 8 executing a broadcast service, on determining whether a handoff is to be performed, at first checks a progress of reception of an upper layer packet which is in a layer higher than a radio communication layer, the upper layer packet being under reception and being assigned with a sequence number.

In a case where the radio communication terminal (AT) 8 determines that the reception of the currently receiving upper layer packet is to be completed within a certain period of time (for example, three seconds) based on the most recent transfer rate (for example, a data transfer rate over the last 30 seconds), the radio communication terminal 8 temporarily suspends handoff processing (operation) until the reception of the upper layer packet currently received is completed.

In a case where the radio communication terminal (AT) 8 determines that the reception of the currently receiving upper layer packet is to be completed after a certain period of time or in a case where the reception of the upper layer packet is completed, the radio communication terminal (AT) 8 transmits a BCMCS handoff message indicating that the handoff is to be performed, as shown in FIG. 6, to the access point (AP) 7 as a the base station before the handoff.

After transmitting the message, the radio communication terminal (AT) 8 continues to receive the broadcast data for a certain period (for example, 30 slots), and after that, performs the handoff. This period is a margin provided considering that the base station has already finished scheduling of data transfer.

In the radio communication system 1, in a case where, for example, broadcast content included in the BCMCS handoff message of the radio communication terminal (AT) 8 is of an accumulation type (regeneration from accumulation on the terminal) that does not require real time property such as in streaming, the base station before the handoff and the base station of the handoff destination synchronize the broadcast data scheduling, both the base station before the handoff and the base station of the handoff destination suspend broadcasting of the broadcast data for a certain period of time (for example, 200 slots). That is, in the radio communication system 1, in the case where the base station which has received the BCMCS handoff message from the radio communication terminal (AT) 8 and the base station of the handoff destination synchronize the broadcast data scheduling, both the base stations suspend broadcasting of next broadcast data for a certain period of time.

In this case, when a plurality of radio communication terminals (ATs) request handoffs, the broadcast data cannot be sent in the meantime thus causing the transfer rate to drop. In order to avoid this, when the base station receives a plurality of BCMCS handoff messages within a short period, the base station transmits a handoff sync message as shown in FIG. 7 on a broadcast channel, for synchronizing a time in which the handoffs are performed in the plurality of radio communication terminals (AT) 8.

In a case where the base station of the handoff destination does not synchronize the broadcast data scheduling with that of the base station before the handoff, and is not broadcasting (delivering) the broadcast content, the base station of the handoff destination (after handoff) starts to transmit the upper layer packet having a sequence number which is desired next by the radio communication terminal (AT) 8 based on the information received from the base station before the handoff.

In a case where broadcasting is already started or the broadcast content requires the real time property in the radio communication system 1 according to this embodiment, the base station before the handoff notifies the base station of the handoff destination of the BCMCS handoff message, although the base station of the handoff destination neglects this message.

In other words, in the radio communication system 1, the base station that has received the BCMCS handoff message from the radio communication terminal (AT) 8 notifies the base station of the handoff destination of the sequence number included in the handoff message. In the case where the base station that is notified of the sequence number is not currently broadcasting the broadcast data, broadcasting starts so as to continue the sequence number.

The radio communication terminal (AT) 8 of this embodiment will be described.

Figure 8:
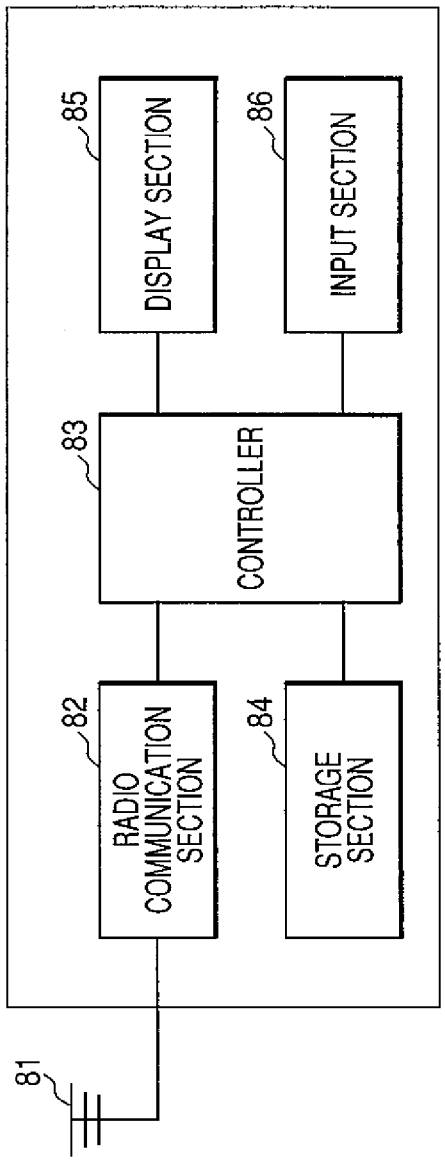
FIG. 8 is a block diagram showing a configuration of a radio communication terminal (AT) 8 according to an embodiment of the invention.

FIG. 8 is a block diagram of a configuration of the radio communication terminal (AT) 8 according to this embodiment.

Figure 9:
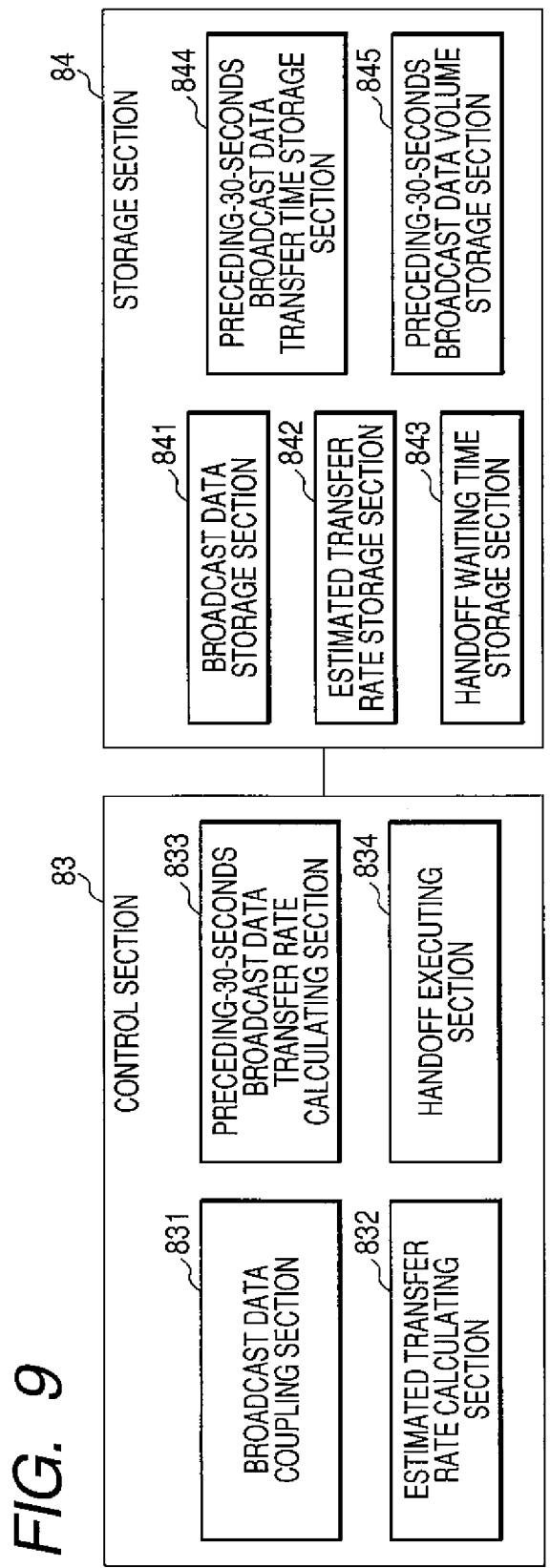
FIG. 9 is a block diagram of a controller and a storage section in the radio communication terminal (AT) 8 according to an embodiment of the invention.

FIG. 9 is a block diagram of a controller and a storage section in the radio communication terminal (AT) 8 according to this embodiment.

The radio communication terminal (AT) 8 not only performs normal audio communication and data communication, but also performs reception of the BCMCS. The radio communication terminal (AT) 8 includes, as its main components, an antenna 81, a radio communication section 82, a controller 83, a storage section 84, a display section 85 and an input section 86.

The antenna 81 is connected to the radio communication section 82, receives radio waves transmitted from the access point (AP) 7 as the base station, and transmits radio waves to the access point (AP) 7.

The radio communication section 82 demodulates a high frequency signal received at the antenna 81 to obtain a digital signal, and modulates, under the control of the controller 83, a digital signal to be transmitted so as to transmit the digital signal to the antenna 81.

The controller 83 executes a program stored in the storage section 84 so as to control operations of audio communication and data communication and perform processes of various services that employ radio communication. The controller 83, for example, controls the reception of the service information related to the broadcast service, controls a switching (a handoff) of the access point (AP), or the like.

While executing (receiving) the broadcast service, when determining whether the handoff is to be performed, the controller 83 at first checks progress of the reception of the currently receiving upper layer packet to which the sequence number is assigned.

As a result of checking the progress of the reception, when determining that the reception of the upper layer packet being received is to be completed within a certain period (for example, three seconds) based on the most recent transfer rate (for example, the data transfer rate of the last 30 seconds), the controller 83 temporarily suspends the handoff processing (operation) until the reception of the currently received upper layer packet is completed. That is, as a result of checking the progress of the reception, when it is determined that the reception of the currently receiving packet having the sequence number is to be completed within a certain period, the controller 83 does not perform the handoff control until the reception of the upper layer packet is completed.

In a case where it is determined that the reception of the currently receiving upper layer packet is to be completed after a certain period, or in a case where the reception of the upper layer packet is completed, the controller 83 transmits the BCMCS handoff message indicating the handoff is to be performed to the access point (AP) 7 as the base station before the handoff.

This message includes a flow ID (FlowID) (identification information of broadcast) of the broadcast content being received, the sequence number of the broadcast data received the latest and information on the base station of the handoff destination.

The controller 83, after transmitting the message, continues receiving the broadcast data for a certain period of time (for example, 30 slots) then performs the handoff.

The controller 83, on receiving the handoff sync message from the base station, performs the handoff based on the time being set in the message.

In order to provide these features, the controller 83 includes a broadcast data coupling section 831, an estimated transfer rate calculating section 832, a preceding-30-seconds broadcast data transfer rate calculating section 833, and a handoff executing section 834, as shown in FIG. 9.

The storage section 84 stores information required for the operations of the radio communication terminal (AT) 8, and a control program. For example, the service information currently received by the radio communication terminal (AT) 8, information obtained and processed by the controller 83 upon receiving the service information, and peripheral base station information received from the access point (AP) 7 which serves as the base station, are stored in the storage section 84.

In order to store the information obtained by the controller 83 through the reception of the broadcast data, which is the service information, the storage section 84 includes, as shown in FIG. 9, a broadcast data storage section 841, an estimated transfer rate storage section 842, a handoff waiting time storage section 843, a preceding-30-seconds broadcast data transfer time storage section 844, and a preceding-30-seconds broadcast data volume storage section 845.

The display section 85 is controlled by the controller 83, and includes: a display panel, such as an LCD (liquid crystal display), on which character information, image information, operating states (electric field intensity, remaining amount of battery power, time, and the like) of the radio communication terminal (AT) 8, and the like are displayed; and a backlight for illuminating the display panel.

The input section 86 accepts inputs of characters and numbers, and instructions of operations to the radio communication terminal (AT) 8, and the like.

Figure 12:
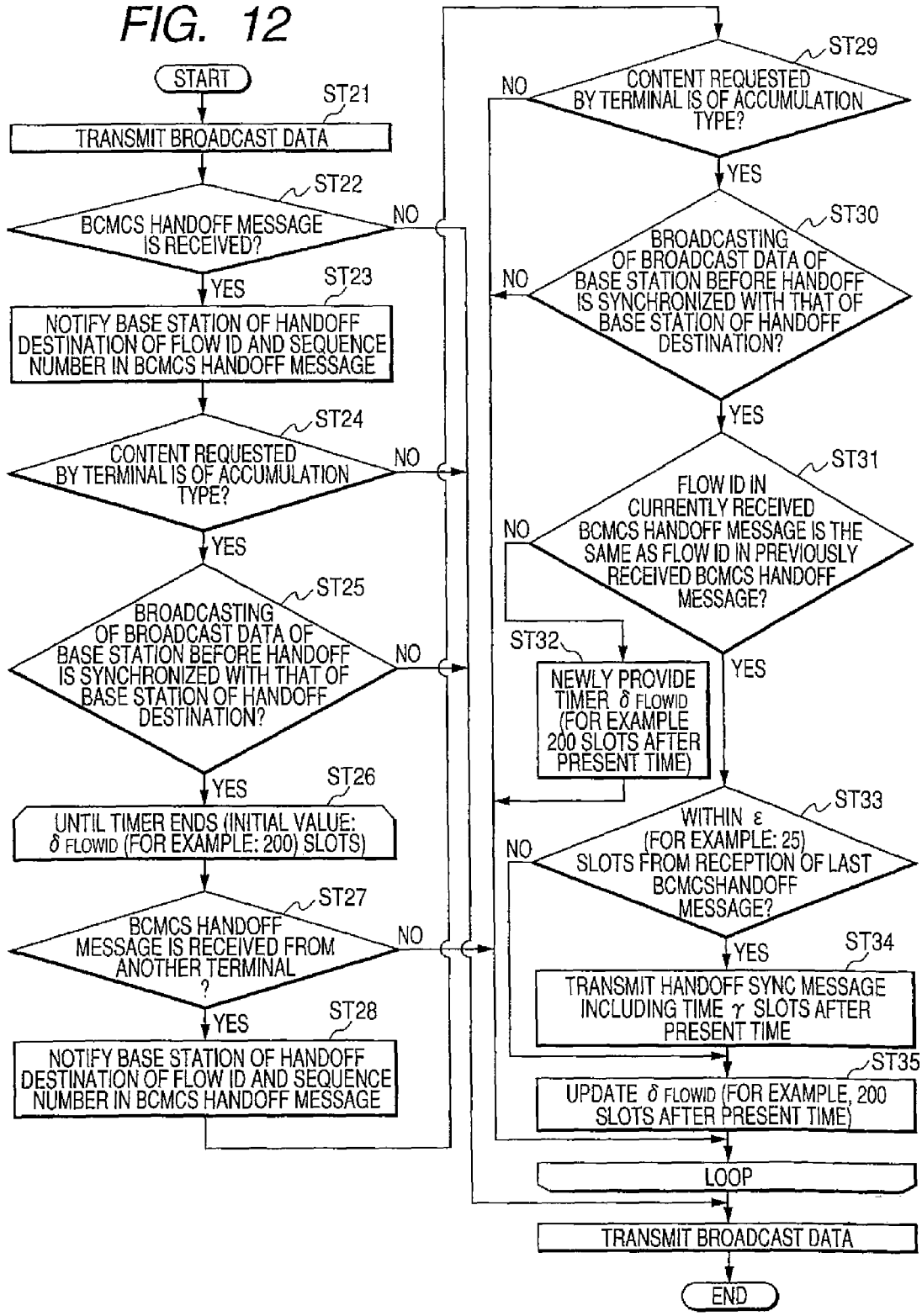
FIG. 12 is a flowchart showing an operation of the base station before handoff according to an embodiment of the invention.
Figure 13:
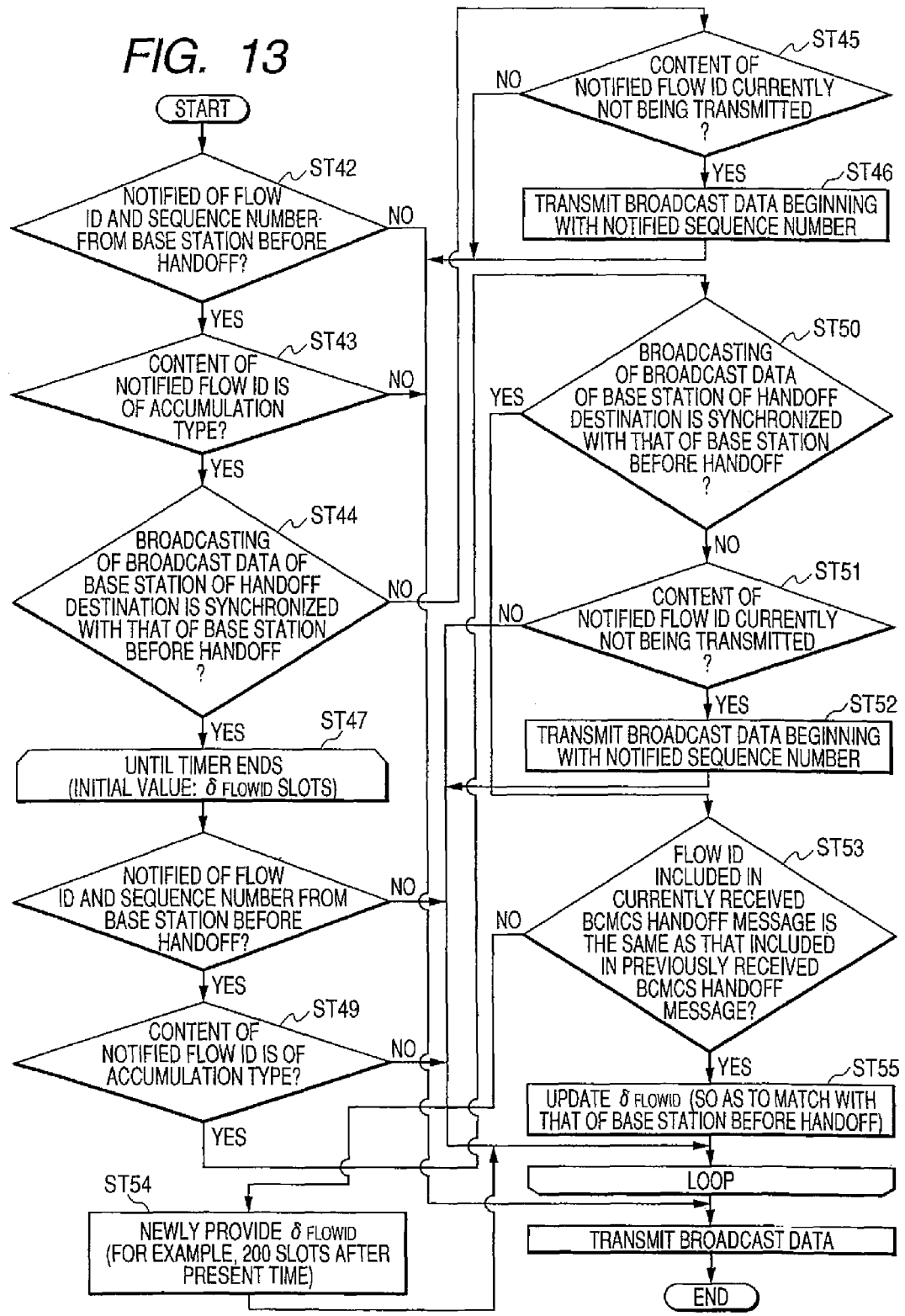
FIG. 13 is a flowchart showing an operation of the base station of a handoff destination according to an embodiment of the invention.

Operation of the radio communication terminal receiving the broadcast data for example via the 1xEV-DO communication system, operation of the base station before the handoff, and operation of the base station of the handoff destination according to this embodiment will be described in relation to the flowcharts in FIGS. 11 to 13.

Figure 10:
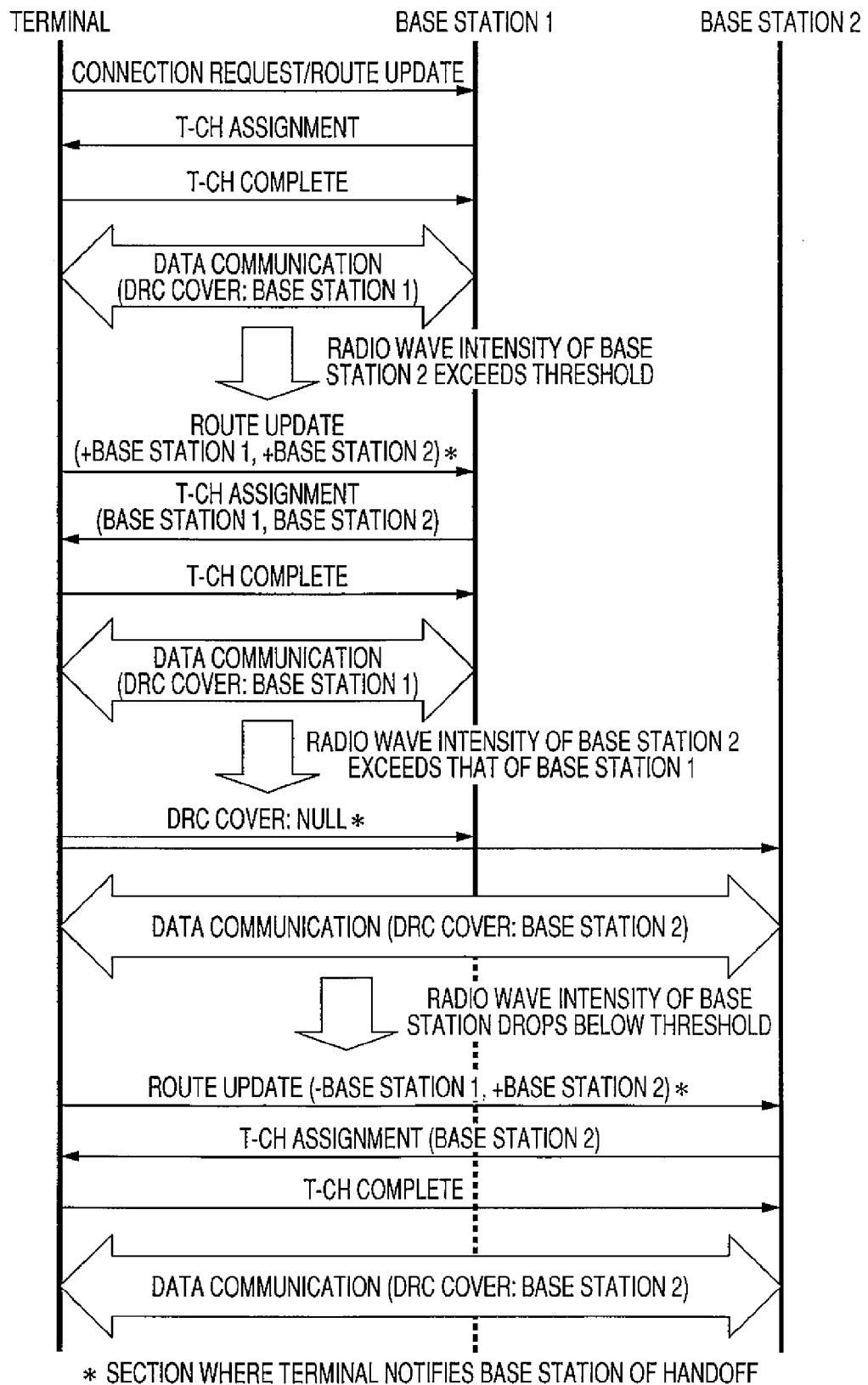
FIG. 10 is a diagram showing a sequence example in a case where a handoff is performed to a base station (2) after a radio communication terminal and a base station (1) established a connection.

FIG. 10 is a diagram showing an example of a sequence in a case where the handoff to a base station (2) is performed after the radio communication system 1 and a base station (1) have established a communication.

Figure 11:
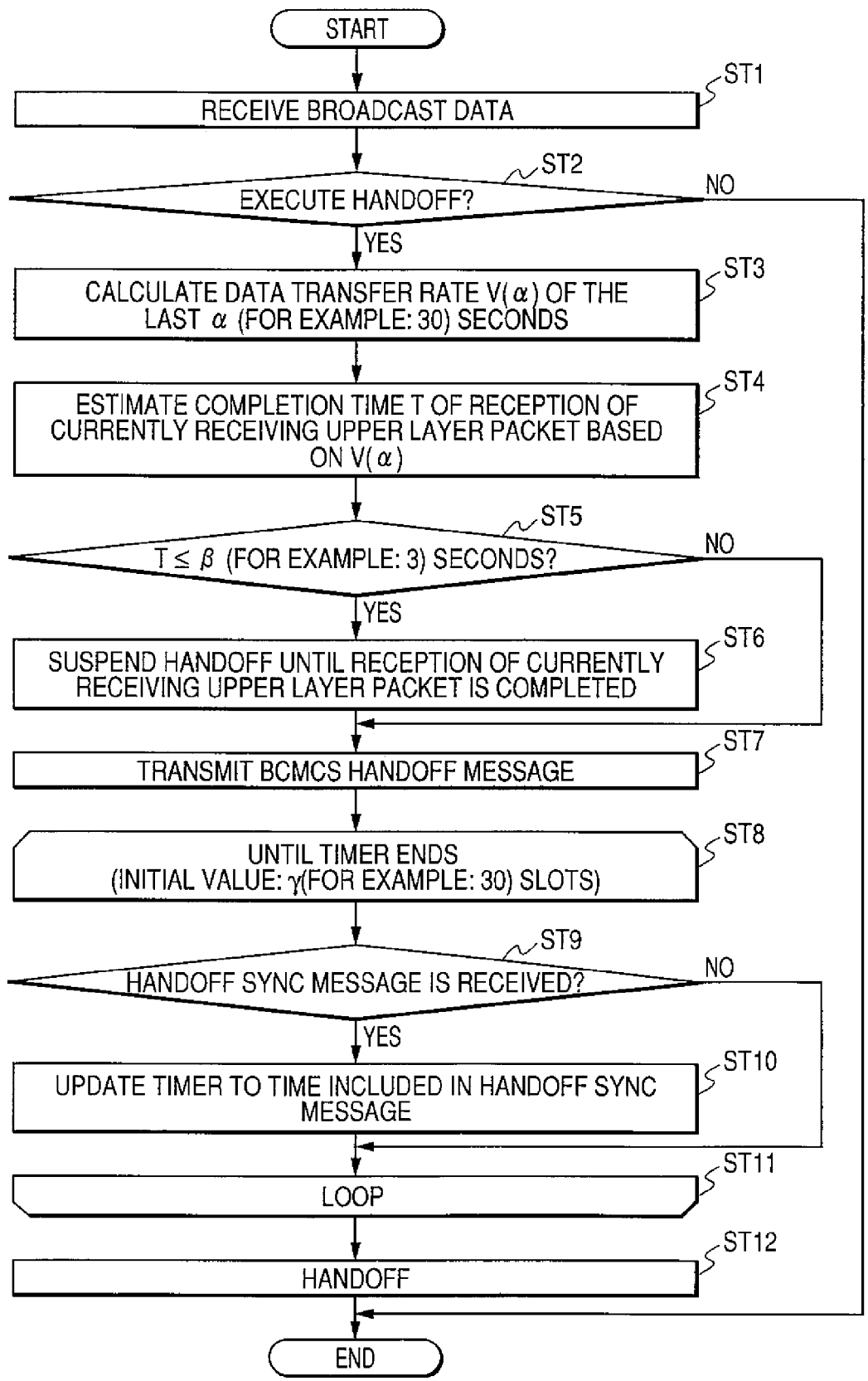
FIG. 11 is a flowchart showing an operation of the radio communication terminal according to an embodiment of the invention.

FIG. 11 is a flowchart showing the operation of the radio communication terminal according to this embodiment. FIG. 12 is a flowchart showing the operation of the base station before the handoff according to this embodiment. FIG. 13 is a flowchart showing the operation of the base station of the handoff destination according to this embodiment.

In the example of FIG. 10, the radio communication terminal (AT) 8 issues a connection request message and a route update message to the base station (1). Then, a traffic channel (T-CH) is assigned by the base station (1), and the channel is established so as to perform data communication.

In this state, when the radio communication terminal (AT) 8 travels and the radio wave intensity of the base station (2) exceeds a threshold, the radio communication terminal (AT) 8 issues a route update message to the base stations (1) and (2) in order to notify the base station (1) of the possibility of a handoff. The base station (1) notifies the base station (2) that the radio communication terminal (AT) 8 is assigned with a traffic channel (T-CH) that allows the radio communication terminal (AT) 8 to communicate with the base station (2).

When the radio wave intensity of the base station (2) exceeds that of the base station (1), the radio communication terminal (AT) 8 issues DRC (data rate control) cover (NULL) of the base stations (1) and (2) so as to perform data communication with the base station (2).

When the radio wave intensity of the base station (1) drops below a threshold, the radio communication terminal (AT) 8 issues a route update message to the base station (2) in order to notify the base station (2) that there is no possibility of a handoff to the base station (1). The base station (2) notifies the radio communication terminal (AT) 8 of a message indicating that the base station (1) is to be removed.

Next, the operation of the radio communication terminal will be described in relation to FIG. 11.

[Operation of Terminal]

When the radio communication terminal (AT) 8 receiving the broadcast data performs the handoff, before performing the handoff, the terminal estimates a completion time T of the reception of the upper layer packet having the sequence number currently receiving based on the data transfer rate of the last α (for example, 30) seconds.

In a case where T is estimated to be shorter than a predetermined time of β (for example, 3) seconds, execution of the handoff is suspended until the reception of the upper layer packet being received is completed (ST1-ST6).

In a case where T is estimated to exceed β seconds, or where the reception of the upper layer packet being received is completed, the terminal transmits the BCMCS handoff message including the currently receiving flow ID (FlowID), the sequence number which is already received and the information on the base station of the handoff destination (ST7).

Considering also preparation in the base stations, after the BCMCS handoff message is transmitted (ST7), a timer of Y (for example, 30) slots is provided. The terminal suspends the handoff processing (operation) until the timer ends while continuing to receive the broadcast data (ST8, ST9).

On receiving the handoff sync message before the timer ends, the terminal resets the value of Y to the time included in the message (ST9-ST11).

When the timer ends, the terminal performs the handoff (ST12).

Next, the operation of the base station before the handoff will be described in relation to FIG. 12.

[Operation of Base Station before Handoff]

When the base station broadcasting the broadcast data receives the BCMCS handoff message from the radio communication terminal (AT) 8, the base station notifies the base station of the handoff destination of the flow ID (FlowID) and the sequence number included in the message (ST21-ST23).

When the content that is requested by the terminal is not of the accumulation type (regeneration from accumulation on the terminal), the message is neglected (ST24).

Figure 1:
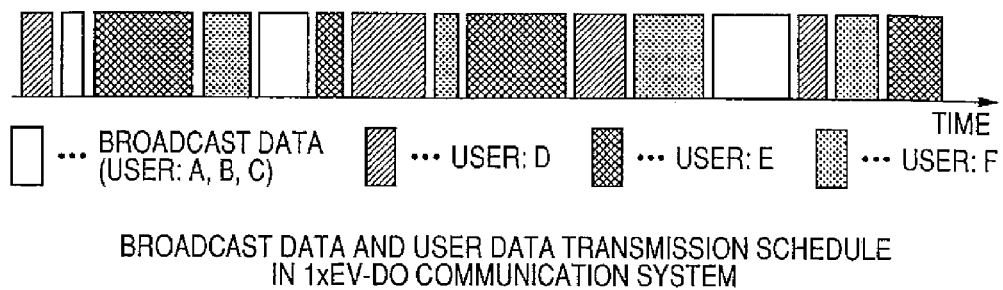
FIG. 1 is a diagram showing a broadcast data and user data transmission schedule in 1xEV-DO communication system.
Figure 2:
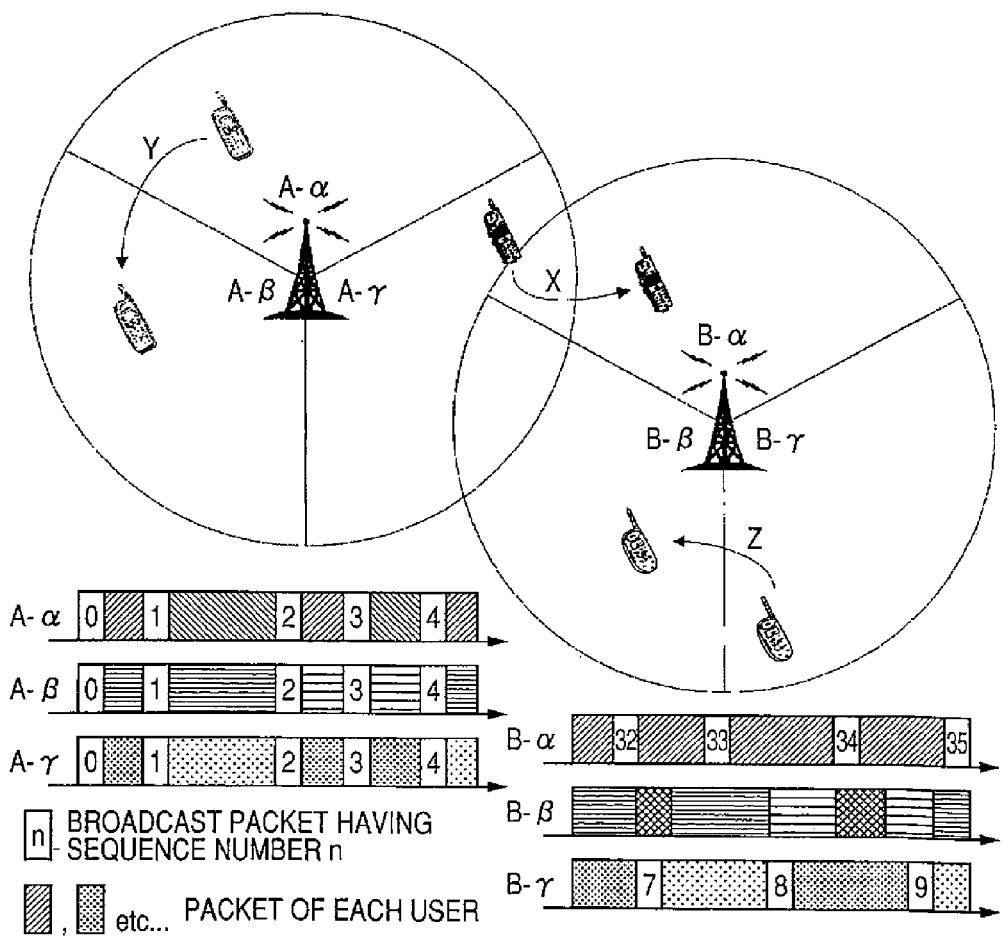
FIG. 2 is a diagram showing a broadcast data transmission schedule for each base station in the 1xEV-DO communication system.
Figure 3:
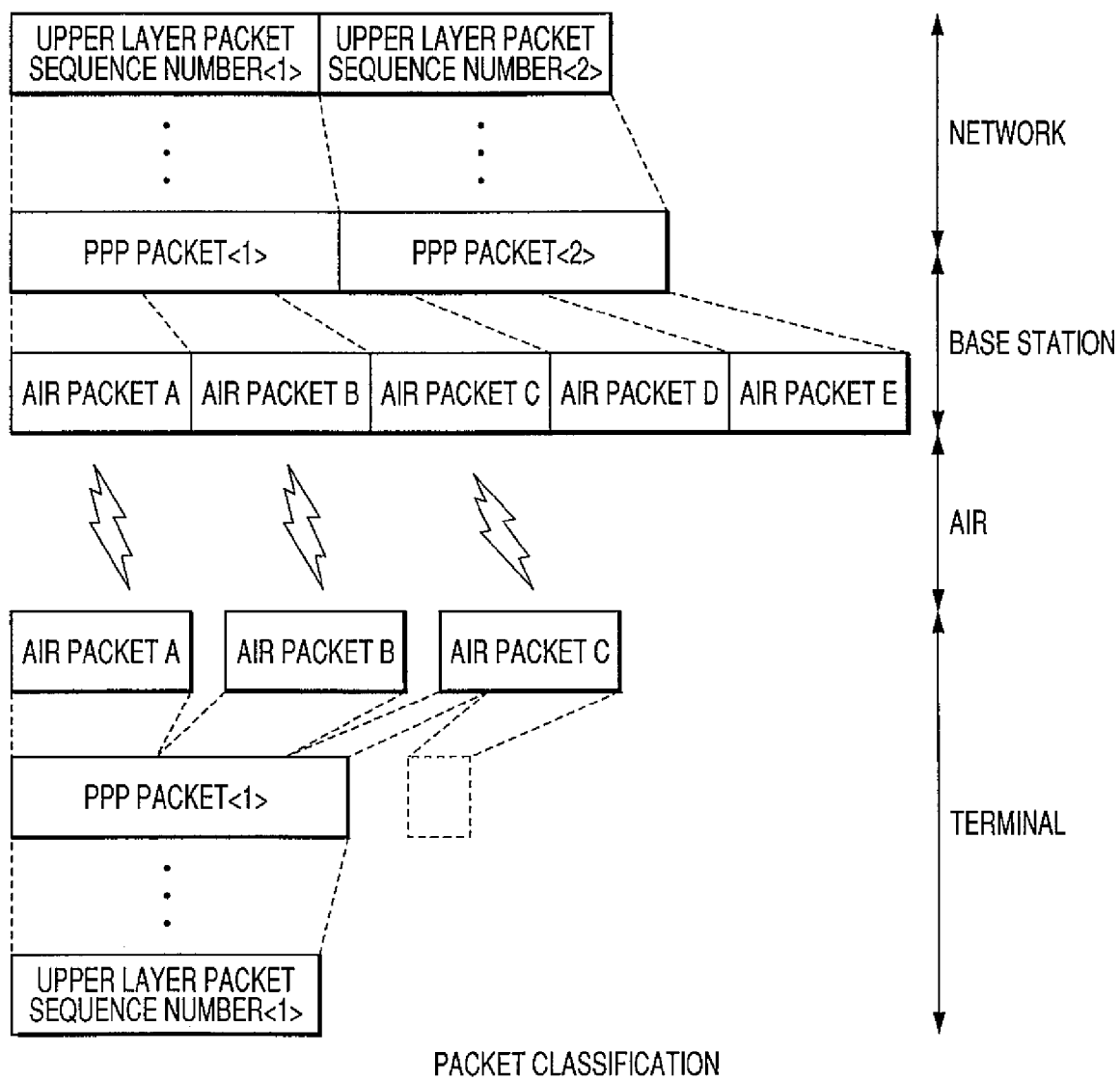
FIG. 3 is a diagram showing an example where the broadcast data is divided and transmitted in packets.
Figure 4:
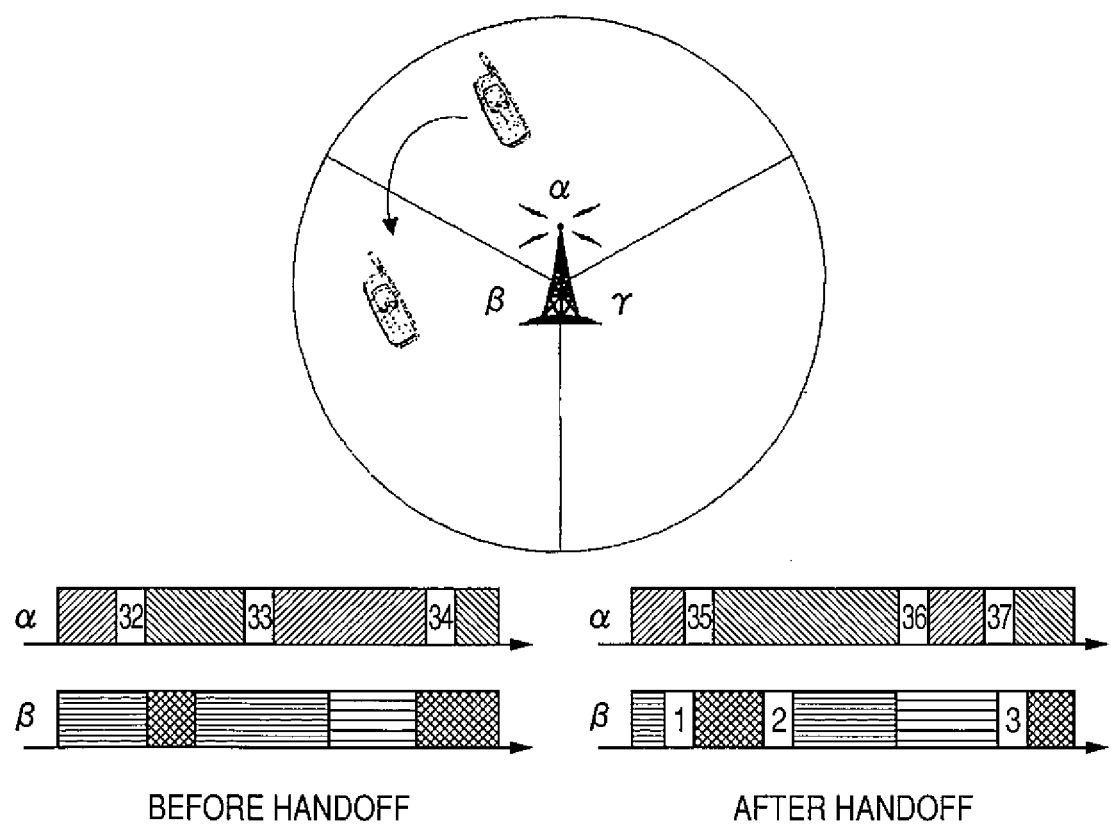
FIG. 4 is a diagram showing a base station in which broadcasting is started.

In a case where the broadcasting of the broadcast data of the base station before the handoff is not synchronized with that of the base station of the handoff destination, the message is neglected (handoff represented by "X" in FIG. 2) (ST25).

In a case where the broadcasting of the broadcast data of the base station before the handoff is synchronized with that of the base station of the handoff destination, (handoff represented by "Y" in FIG. 2), a timer $\delta_{FlowID}$ (for example, 200 slots) is provided and broadcasting of the broadcast data is suspended in the meantime (ST26).

On receiving the BCMCS handoff message from another terminal before the timer ends (ST27), the base station before the handoff notifies the base station of the handoff destination of the flow ID (FlowID) and the sequence number included in the message (ST28).

When the content that is requested by the terminal is not of the accumulation type, the message is neglected (ST29).

In a case where the broadcasting of the broadcast data of the base station before the handoff is not synchronized with that of the base station of the handoff destination, the message is neglected (handoff represented by "X" in FIG. 2) (ST30).

After the checking in step ST30, in a case where the broadcasting of the broadcast data of the base station before the handoff is not synchronized with that of the base station of the handoff destination, and the flow ID (FlowID) included in the currently received BCMCS handoff message differs from the flow ID (FlowID) included in the previously received the BCMCS handoff message, the timer $\delta_{FlowID}$ newly provided for the flow ID (FlowID) included in the currently received BCMCS handoff message (ST31, ST32).

In a case where the flow ID (FlowID) included in the currently received BCMCS handoff message is the same as the flow ID (FlowID) included in the previously received the BCMCS handoff message, and the time when the currently received BCMCS handoff message is received is within ε (for example: 25) slots from the reception of the previously received (last) BCMCS handoff message (ST33), the base station before the handoff transmits the handoff sync message including a time which is γ slots ahead from the present time (ST34). That is, the base station sets the handoff time based on the last message received from the terminal.

Then, the base station before the handoff updates the timer $\delta_{FlowID}$ (for example, 200 slots ahead from the present time) (ST35).

Next, the operation of the base station of the handoff destination will be described in relation to FIG. 13.

[Operation of Base Station of Handoff Destination]

The base station of the handoff destination is notified of the flow ID (FlowID) and the sequence number included in the BCMCS handoff message from another base station (ST42).

When the content of the notified flow ID is not of the accumulation type, the message is neglected (ST43).

In a case where the broadcasting of the broadcast data of the handoff destination is not synchronized with that of the base station before the handoff (the base station transmitting the BCMCS handoff message), and the broadcast data of the noticed flow ID (FlowID) is currently transmitted, the message is neglected.

In a case where the broadcast data of the notified flow ID (FlowID) is not being transmitted (handoff represented by "Z" in FIG. 2), the base station of the handoff destination starts transmitting the broadcast data beginning with the notified sequence number (ST44-ST46).

In a case where the broadcasting of the broadcast data of the handoff destination is synchronized with that of the base station before the handoff in step ST44, the timer $\delta_{FlowID}$ which is same as the base station before the handoff is provided (ST47). The base station before the handoff may notify the base station of the handoff destination of the timer $\delta_{FlowID}$.

In a case where the base station is notified of a new flow ID (FlowID) and sequence number before the timer ends, the message is neglected when the content of the notified flow ID (FlowID) is not of the accumulation type (ST49).

In a case where the broadcasting of the broadcast data of the handoff destination is not synchronized with that of the base station before the handoff (the base station transmitting the BCMCS handoff message), and the broadcast data of the notified flow ID (FlowID) is currently transmitted, the message is neglected.

In a case where the broadcast data of the notified flow ID (FlowID) is not being transmitted (handoff represented by "Z" in FIG. 2), the base station of the handoff destination starts transmitting the broadcast data beginning with the notified sequence number (ST50-ST52).

After the checking in step ST50, when the broadcasting of the broadcast data of the handoff destination is synchronized with that of the base station before the handoff, in a case where the flow ID (FlowID) included in the currently received BCMCS handoff message differs from the flow ID (FlowID) included in the previously received BCMCS handoff message while synchronization is established, the timer $\delta_{FlowID}$ is newly provided for the flow ID (FlowID) included in the currently received BCMCS handoff message (ST53, ST54).

In a case where the flow ID (FlowID) included in the currently received BCMCS handoff message is the same as the flow ID (FlowID) included in the previously received BCMCS handoff message, the timer $\delta_{FlowID}$ is updated so as to match with that in the base station before the handoff (ST55).

Exemplary values used above may be other values.

FIG. 14 illustrates the advantage of the invention.

In a related art technology, the handoff is performed when handoff conditions are satisfied irrespective of whether the broadcast data is being received. As a result, the upper layer packet that is to be completed by receiving the upper layer packet little longer (34th packet in FIG. 14) is discarded. Moreover, since the base station does not consider the time taken by the handoff in the terminal, a packet (35th packet in FIG. 14) is being transmitted even while performing the handoff, and the terminal loses the packets (lost). When the handoff to a base station that is to start broadcasting the content requested by the terminal newly (II in FIG. 14), the base station of the handoff destination transmits the broadcast data from the beginning.

On the other hand, according to this embodiment, in a case where the handoff is to be performed while the broadcast via the broadcast/multicast service is being received, the progress of the reception of the upper layer packet in a layer higher than the radio communication layer is checked, and the handoff is suspended until the reception of the upper layer packet is completed, if the reception of the upper layer packet is to be completed in a short time. Then, the BCMCS handoff message is transmitted to the base station, and the handoff is performed after a certain amount of time (* portion in FIG. 14).

The base station suspends the broadcasting of the broadcast data for the time required by the terminal for the handoff operation in addition to a margin. In a case where the base station of the handoff destination starts to newly transmit the content requested by the radio communication terminal (II in FIG. 14), the base station starts to transmit the content beginning with an upper layer packet which is requested by the radio communication terminal to be received next. As a result, a smooth handoff is enabled without the terminal losing the broadcast data at the time of the handoff or receiving the same data again.

While the above description takes a case of the broadcast as an example, the invention is also applicable to a case of the multicast.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A base station comprising:
a broadcasting section which performs a broadcast of at least one of a broadcast service and a multicast service;
a receiver which receives a first message indicating a handoff is to be performed from at least one radio communication terminal, the first message including identification information of the broadcast being received by the radio communication terminal, a sequence number of a packet received by the radio communication terminal, and information on a base station of a handoff destination;
a notifying section which notifies the base station of the handoff destination, of the identification information of the broadcast and the sequence number of the packet; and
a transmitter which transmits a second message indicating a time to perform the handoff to the radio communication terminal; wherein
the packet is not a channel burst, and
when the receiver receives the first message from each of a plurality of radio communication terminals, the transmitter transmits the second message indicating the time to perform the handoff being set based on the first message that is received the latest to each of the plurality of radio communication terminals.

2. A base station control method comprising:
performing a broadcast of at least one of a broadcast service and a multicast service;
receiving a first message indicating a handoff is to be performed from at least one radio communication terminal that is receiving the broadcast, the first message including identification information of the broadcast being received by the radio communication terminal, a sequence number of a packet received by the radio communication terminal, and information on a base station of a handoff destination;
notifying the base station of the handoff destination, of the identification information of the broadcast and the sequence number of the packet; and
transmitting a second message indicating a time to perform the handoff to the radio communication terminal; wherein
the packet is not a channel burst, and
when the first message is received from each of a plurality of radio communication terminals, the second message indicating the time to perform the handoff being set based on the first message that is received the latest is transmitted to each of the plurality of radio communication terminals.

* * * * *